3,304,727
REFLUX CONDENSATION BY HEAT EXCHANGE WITH A COMPOSITE STREAM
Carleton H. Roskamp, Donald R. Bates, Robert D. Heckart, and Luther F. Mayhue, Bartlesville, Okla., assignors to Phillips Petroleum Company, a corporation of Delaware
Filed Nov. 23, 1964, Ser. No. 412,929
4 Claims. (Cl. 62—28)

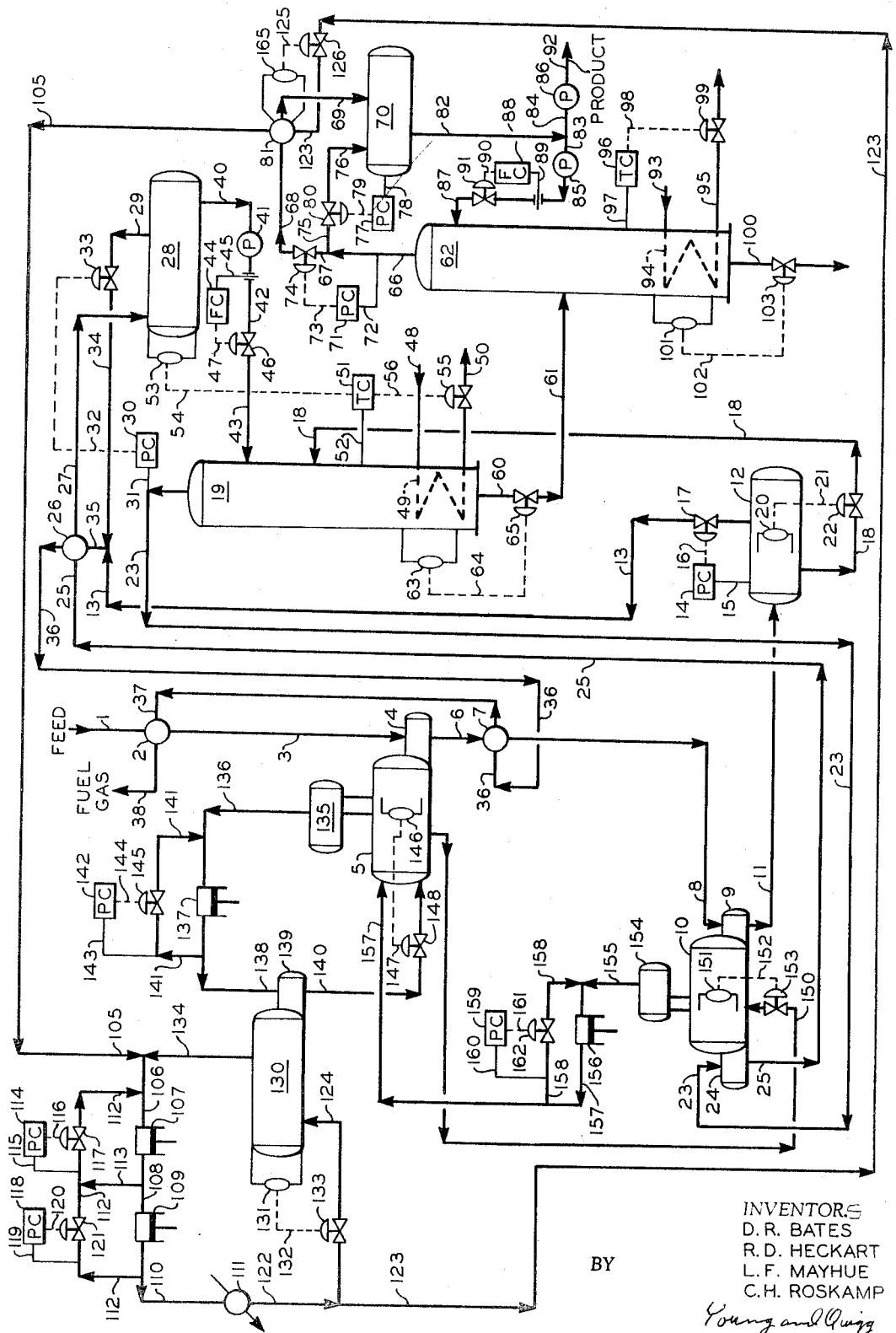

This invention relates to a method and apparatus for the purification of a hydrocarbon feed.

Heretofore in the purification of an ethylene-hydrocarbon feed, i.e. a hydrocarbon feed having a substantial amount of ethylene, to product an ethylene-rich stream for use in subsequent alkylation operations, hydrocarbons and other compounds which boil at a lower temperature than ethylene were removed from the feed and from the system and utilized elsewhere as a fuel gas.

It has now been found that the hydrocarbons and other compounds which boil at a temperature lower than ethylene, hereinafter referred to as light components, have a significant refrigeration potential which potential can be utilized in the ethylene-hydrocarbon feed purification operation to thereby effect more efficient refrigeration at a lower overall cost and with a smaller refrigeration plant.

Thus, by this invention a maximum amount of low temperature refrigeration is effected by utilizing the relatively low temperature of the light components and by exploiting the even lower temperature potential of these light components due to their high pressure, all of which was heretofore lost.

According to this invention a high pressure stream of an ethylene-hydrocarbon feed is initially cooled to a sufficiently low temperature and a sufficiently high pressure to liquefy substantially all the components in the feed except the lighter components, i.e. methane and other compounds. The thus produced liquid-vaporous, ethylene-hydrocarbon material has a part of the vaporous light components removed to form a first stream and substantially the remainder of the vaporous light components separately removed to form a second stream. The two streams of light components being cool and at relatively high but different pressures are cooled further by separately lowering the pressures on each stream. The streams are then combined to form a composite, cold stream which is utilized to cool other light components which have subsequently been used to form said second stream in order. This cooling condenses, for later recovery, at least a part of the heavier materials present in these subsequently added light components. The composite stream is thereafter utilized to cool incoming high pressure ethylene-hydrocarbon feed which is to be purified to condense at least a part of the heavier portions of the feed for subsequent separation therefrom of light components in the manner discussed above.

Accordingly, it is an object of this invention to provide a method whereby a hydrocarbon feed is purified by refrigeration in which the maximum amount of low temperature refrigeration is effected to produce more efficient refrigeration at lower overall cost. It is another object of this invention to provide apparatus for the purification of a hydrocarbon feed whereby more efficient refrigeration at lower cost is achieved with a simultaneous reduction in the size requirement of the refrigeration plant with no reduction in production capacity.

Other aspects, objects and the several advantages of the invention will be apparent to those skilled in the art from the description, the drawing and the appended claims.

The drawing shows diagrammatically a system embodying this invention.

In the drawing, an ethylene-hydrocarbon feed containing light components passes by 1 to heat exchanger 2 in which the feed indirectly contacts cooled light components from a source to be described later. The cool feed then passes by 3 to coil 4 of heat exchanger 5 to be further cooled and then by 6 to heat exchanger 7 to be cooled further and then by 8 to coil 9 of heat exchanger 10 to be cooled even further and then by 11 to feed accumulator 12. The amount of cooling of the feed by 2, 4, 7 and 9 is on the order of about 240° F., i.e. from plus 100° F. to minus 140° F. In order to maintain the heavier portions of the feed in a liquid state, the pressure in accumulator 12 is relatively high, for example on the order of about 400 p.s.i.a. at about minus 140° F., and therefore the light vaporous components removed from accumulator 12 by 13 are further cooled on the order of about 15° F. by reducing the pressure on said light components on the order of about 50 p.s.i. by passing same through expansion valve 17.

In feed accumulator 12 the feed is substantially completely in a liquefied condition except for a certain amount of light or lower boiling components. The vaporous light components are removed from accumulator 12 by 13, the rate of removal being controlled by pressure controller 14 which is operatively connected by 15 to accumulator 12 and by 16 to motor valve 17. The liquefied feed which still contains a certain amount of light components therein passes from accumulator 12 by 18 to fractionator 19. The flow of liquefied feed material passing through 18 is controlled by liquid level controller 20 which is operatively connected by 21 to motor valve 22 and partially vaporized by flashing to the fractionator pressure.

In fractionator 19 the top temperature is on the order of about 15° F. higher and the pressure is on the order of about 30 p.s.i. lower than the temperature and pressure in accumulator 12. Thus, liquefied light components are vaporized and substantially all of the vaporous light components present are removed overhead by 23 through coil 24 of heat exchanger 10 to be cooled on the order of 15° F. and then by 25 through heat exchanger 26 to be cooled further on the order of about 5° F. and by 27 into accumulator 28. Accumulator 28 is maintained at a temperature on the order of about minus 145° F. and a pressure on the order of about 365 p.s.i.a. Heavier components in 25 are partially condensed in a heat exchanger 26 and therefore accumulator 28 contains a liquid material and a vapor material therein. The liquid in accumulator 28 is maintained liquid by maintaining a low temperature and a high pressure therein. Vaporous light components are removed from accumulator 28 by 29. The rate of removal of light components through 29 is controlled by pressure controller 30 which is operatively connected by 31 to fractionator overhead pipe 23 and by 32 to motor valve 33. Since the light components in 29 are under high pressure they are further cooled on the order of about 20° F. by reducing the pressure thereon on the order of up to about 100 p.s.i. by expanding same through valve 33. The quite cold light components, e.g. about minus 165° F., are passed from valve 33 through 34 to be mixed with quite cold light components, e.g. about minus 155° F., from 13 to form a composite stream of cold, e.g. about minus 160° F., light components which then passes by 35 through heat exchanger 26. In heat exchanger 26 the light components from 35 are at a lower temperature, e.g. about minus 158° F., than the overhead components from 25, e.g. about minus 142° F., and therefore extract heat from the components in 25 thereby cooling, e.g. to about minus 147° F., and at least partially condensing same. The composite stream of light components, e.g. at about minus 148° F., then passes by 36 through heat exchanger 7 to cool incoming feed in 6 and then passes by 37 to heat exchanger 2 to cool additional feed from 1. The lighter components then leave heat exchanger 2 by way of 38 and since they are at that time at a relatively low pressure and relatively warm, e.g. at ambient temperatures of from about 70° to about 90° F., they have substantially no practical refrigeration potential left and are now suitable for use as fuel gas elsewhere.

The liquefied components in accumulator 28 pass therefrom by 40 through pump 41, through 42 and through 43 into fractionator 19 as reflux therefor. The flow of reflux to fractionator 19 is controlled by flow controller 44 which is operatively connected to line 42 by 45 and to motor valve 46 in line 43 by 47. The heat necessary to reboil the tower to effect the vaporization and separation of the light components from the rest of the feed is supplied to fractionator 19 by a suitable heating medium such as heated oil or stream passing by 48 into heat exchanger 49 and then out by way of 50. The temperature below the feed in fractionator 19 is sensed by temperature controller 51 which is operatively connected by 52 (e.g. using a thermocouple) to fractionator 19. Temperature controller 51 is set to maintain fractionator 19 at a specific kettle temperature on the order of about 15° F. Liquid level controller 53 on accumulator 28 is operatively connected to temperature controller 51 by 54 and temperature controller 51 is operatively connected to motor valve 55 in line 50 by 56. The arrangement of liquid level controller 53, temperature controller 51 and motor valve 55 is such that liquid level controller 53 will reset temperature controller 51 to a different specific temperature should there be too much or too little overhead light components collecting in accumulator 28 and temperature controller 51 will in turn regulate the opening of motor valve 55 to either increase or decrease the heat flow into fractionator 19. For example, if the specific temperature at which temperature controller 51 is originally set is too high then an excessive amount of light components will pass overhead from fractionator 19 through 23, 24, 25, 26, 27 and into accumulator 28. The level of liquid in accumulator 28 will then exceed the maximum level for which liquid level controller 53 is set. When this occurs, liquid level controller 53 through 54 resets temperature controller 51 to a lower specific temperature. Due to the lower specific temperature-setting temperature controller 51, that temperature controller through 56 restricts the opening in motor valve 55 thereby decreasing the amount of heat supplied to fractionator 19 and also thereby decreasing the amount of overhead components which will be removed overhead from the fractionator, condensed at least in part, and passed to accumulator 28.

Feed material purified of light components is removed from fractionator 19 by 60 and passes by 61 to fractionator 62. The rate of removal of feed through 60 is controlled by liquid level controller 63 which is operatively connected by 54 to motor valve 65 in 61.

In fractionator 62 propylene and materials lighter than propylene which include ethane, the desired ethylene, and any residual methane, are vaporized and removed overhead by 66, 67, 68, condenser 81, and 69 into accumulator 70. The flow of overhead through 66, 67, 68, 81 and 69 into accumulator 70 is controlled by pressure controller 71 which is operatively connected to 66 by 72 and by 73 to motor valve 74 in line 67. Thus, for example, if the pressure in line 66 should exceed a predetermined maximum value pressure controller 71 will further open motor valve 74 to allow more overhead material to pass by way of condenser 81 into accumulator 70. Overhead material can by-pass condenser 81 by flowing from 66 through 75 and 76 into accumulator 70. The flow of overhead vapor through 75 is controlled by pressure controller 77 which is operatively connected to accumulator 70 by 78 and by 79 to motor valve 80 in line 75. Thus, if, for example, the pressure in accumulator 70 should fall below a predetermined minimum value, pressure controller 77 will further open motor valve 80 thereby allowing additional overhead vapor to by-pass heat exchanger (condenser) 81 and flow directly into accumulator 70 to thereby increase the pressure in the accumulator. Liquid from accumulator 70 passes therefrom by 82 and is split into 83 and 84 by pumps 85 and 86, respectively. That material which flows through pump 85 passes through 87 into fractionator 62 to be utilized as reflux. The flow of material through 87 is controlled by flow controller 88 which is operatively connected to 87 by 89 and by 90 to motor valve 91. That material which passes through 86 is removed by 92 as an enriched ethylene product to be used in the alkylation of other hydrocarbons, for example the reaction of isobutane and ethylene to produce diisopropyl.

The operating kettle temperature, e.g. on the order of about 210° F. of fractionator 62 is controlled by a heating fluid such as oil or steam flowing through 93 into heat exchanger 94 and out through 95. The flow of heating material out through 95 and therefore through heat exchanger 94 is controlled by temperature controller 96 which is operatively connected (e.g. using a thermocouple) to fractionator 62 by 97 and by 98 to motor valve 99 in line 95. Thus, for example, when the temperature in fractionator 62 exceeds a predetermined maximum value temperature controller 96 restricts the opening of motor valve 99 thereby cutting down the amount of heating material passing through heat exchanger 94. That part of the feed which is heavier than propylene passes from fractionator 62 by 100, the rate of flow of which is controlled by liquid level controller 101 which is operatively connected by 102 to motor valve 103 in line 100.

Refrigeration material passing through heat exchanger 81 to extract heat from and thereby at least partially condense the overhead material in line 68 passes from heat exchanger 81 by 105, into 106 and then into compressor 107. The effluent of compressor 107 then passes by 108 into compressor 109 and then through 110 into condenser 111.

In order to ensure that compressors 107 and 109 have a continuous source of vapor upon which to work 112 is openly connected to 110 and 106. Also, 113 openly connects 112 and 108. Thus, if, for example, compressor 107 has insufficient vapor upon which to work the vapor from 110 is returned by 112 to 106. Similarly and concurrently, if necessary, vapor can be returned from 110 through 112 and 113 to 108 for compressor 109. The flow of vapor through 112 to compressor 107 is controlled by pressure controller 114 which is operatively connected by 115 to 112 and by 116 to motor valve 117 in 112. Similarly, the flow of vapor from 110 to compressors 109 and 107 is controlled by pressure controller 118 which is operatively connected to 112 by 119 and by 120 to motor valve 121 in line 112.

Cooled liquid refrigerant from heat exchanger 111 passes by 122 either through 123 or 124 or both. Refrigerant in 123 passes to heat exchanger 81 the rate of flow to which is controlled by liquid level controller 165 which is operatively connected by 125 to motor valve 126 in line 123.

That liquid refrigerant at about 100° and about 205 p.s.i.a. which is in 124 is further cooled passing into heat exchanger 130 by flashing to about 20 p.s.i.a. the flow to which is controlled by liquid level controller 131 which is operatively connected by 132 to motor valve 133 in line 124 Additional refrigerant vapor formed in heat exchanger 130 by relatively warmer refrigernat passing by 138 through coil 139 is removed by 134, mixed with refrigerant from 105 and the mixture passed through 106 for compression, cooling and condensing as described above.

Refrigerant vapor formed in heat exchanger 5 in part by relatively warmer feed passing by 3 through coil 4 passes through knockback condenser 135 which removes liquid from the vapor to protect the compressor 137, through 136, through compressor 137, 138, coil 139 of heat exchanger 130, and 140 into heat exchanger 5. To ensure a constant source of vapors for compressor 137, 141 openly connects 138 and 136 and the flow of vapors from 138 to 136 is controlled by pressure controller 142 which is operatively connected to 141 by 143 and by 144 to motor valve 145 in 141. The flow of refrigerant vapor from heat exchanger 5 through coil 139 of heat exchanger 130 to cool and condense same is controlled by liquid level controller 146 which is operatively connected by 147 to motor valve 148 in line 140 which line passed liquid refrigerant to heat exchanger 5. Thus, for example, if the liqiud level in heat exchanger 5 tries to exceed a maximum desired level, liquid level controller 146 will restrict the opening of motor valve 148 thereby restricting the amount of refrigerant liquid passing through leg 139 of heat exchanger 130 to be flashed at least in part into vapor therein.

Liquid refrigerant from heat exchanger 5 passes by 150 into relatively cooler heat exchanger 10 the flow through which is controlled by liquid level controller 151 which is operatively connected by 152 to motor valve 153. Thus, if, for example, the liquid level in heat exchanger 10 should fall below a predetermined minimum value liquid level controller 151 would further open motor valve 153 to thereby allow additional liquid from heat exchanger 5 to pass through 150 into heat exchanger 10 and flash, at least in part, into vapor therein.

Refrigerant vapor at least in part formed by relatively warmer feed passing by 8 through coil 9 is removed from heat exchanger 10 through knockback condenser 154 which removes liquid from the vapor, through 155, compressor 156, and 157 into relative warmer and higher pressure heat exchanger 5. A continuous source of vapor for compressor 156 is ensured by 158 which is openly connected to 157 and 155 and through which the flow of vapors from 157 is controlled by pressure controller 159 which is operatively connected to 158 by 160 and by 161 to motor valve 162 in 158.

Although this invention can generally be employed whenever there is a requirement for refrigeration-purification of hydrocarbon feeds, it is primarily employed in the purification of high pressure ethylene-hydrocarbon vapors to produce an ethylene concentrate which can be utilized in the alkylation of hydrocarbons such as isobutane in the presence of catalysts such as aluminum halide to produce gasoline constituents such as diisopropyl. A full and complete disclosure of the alkylation of isobutane and ethylene in the presence of aluminum halide catalyst to produce diisopropyl is found in U.S. Patent 2,409,389, issued to Ringham on September 28, 1944.

Although this invention can be practiced on any hydrocarbon feed containing at least about 5 mol percent ethylene, commercially feasible hydrocarbon feeds can contain from a trace to 30 mol percent hydrogen; all percentages hereinafter referred to will be mol percent of the original feed 1 unless otherwise specified, from a trace to 15 percent nitrogen, from 20 to 60 percent methane, from 5 to 60 percent ethylene, from a trace to 35 percent ethane, from a trace to 10 percent propylene, from a trace to 5 percent propane, from a trace to 2 percent butenes, from a trace to 1 percent isobutane, from a trace to 1 percent normal butane, from a trace to 1 percent pentene, from a trace to 1 percent isopentane.

The feed material to fractionator 19 will generally be of a composition similar to that of the original feed except that from about a trace to about 30 percent of hydrogen, from a trace to 15 percent of nitrogen, and from 10 to 40 percent of methane will have been removed from the original feed and therefore be absent from the feed to fractionator 19. Generally, from 10 to 20 mol percent of methane (and other compounds) will be removed from the feed and taken overhead from fractionator 19. Also, generally from 10 to 40 percent of methane (based on the feed 1) and other compounds are removed from accumulator 12 before fractionator 19 and mixed with the overhead from fractionator 19 vapor from accumulator 28 to form a composite stream containing from 10 to 20 percent methane hydrocarbon and other compounds.

The feed to fractionator 62 will depend upon the original feed and the amount of methane and other compounds removed therefrom in accumulator 12 and fractionator 19. Generally, the feed to fractionator 62 will contain based on the feed 1 from a trace to 5 percent methane, from about 5 to 60 percent ethylene, from a trace to about 35 percent ethane, from a trace to about 10 percent propylene, from a trace to about 5 percent propane, from a trace to about 2 percent butenes, from a trace to 1 percent isobutane, from a trace to 1 percent normal butane, from a trace to 1 percent pentene, and from a trace to about 1 percent isopentane. Generally the product of this invention removed overhead from fractionator 62 will contain (percent, based on feed 1) from a trace to about 5 percent methane, from about 5 to about 60 percent ethylene, from a trace to about 35 percent ethane, from a trace to about 10 percent propylene and from a trace to about 1 percent propane.

Generally, the light component vapor removed from accumulator 12 will be at a temperature of at least as low as minus 130° F. and at a pressure of at least as high as 350 p.s.i.a. and after passing through expansion valve 17 will be at a temperature of at least as low as minus 145° F. and a pressure in the range of about 290 to 350 p.s.i.a. Also, the light component vapors removed from accumulator 28 will be at a temperature of at least as low as minus 140° F. and a pressure of at least in the range of 300 to 360 p.s.i., and after passing through expansion valve 33 will be at a temperature of at least as low as minus 160° F. and a pressure in the range of about 200 to 250 p.s.i.a. The composite light component stream produced by combining vapors from accumulators 12 and 28 will be at a temperature of at least as low as minus 150° F. and a pressure of not more than about 250 p.s.i.a. The composite stream after passing through heat exchanger 26 will have a temperature of no higher than minus 140° F. and 10 to 50 p.s.i. lower pressure after leaving the heat exchanger. The composite stream after passing through heat exchanger 7 will have a temperature of at least about minus 60° F. and 10 to 50 p.s.i. lower pressure than before it entered exchanger 7. After leaving heat exchanger 2 the composite stream will have a temperature of at least about 70° F. and a pressure 10 to 50 p.s.i. below its entry pressure. The light composite stream now at 80° F. has been substantially completely exploited for its refrigeration potential. This refrigeration potential of the composite stream is due to its low temperature at the time of removal from accumulators 12 and 28, and also due to the high pressure thereof which can create an even lower temperature by expansion to a lower pressure. Also, the 70° F. to 90° F. light composite stream is now well suited for use as fuel gas elsewhere because of its moderate pressure and temperature and also, of course, due to its composition.

EXAMPLE

| Condition | Unit | | | | | | | |
|---|---|---|---|---|---|---|---|---|
| | 130 | 5 | 10 | 19 | 28 | 62 | 70 | 12 |
| Temperature, top, °F | | | | −126 | | 20 | | |
| Temperature, bottom, °F | | | | 15 | | 209 | | |
| Temperature, average, °F | −32 | −93 | −150 | | −147 | | −3 | −40 |
| Pressure, p.s.i.a. | 19 | 72 | 17 | 370 | 365 | 340 | 320 | 400 |
| Million s.c.f./day | | | | | | | | |
| Gallons/minute | | | | | | | | |

| Condition | Stream | | | | | | | | | | | | |
|---|---|---|---|---|---|---|---|---|---|---|---|---|---|
| | 1 | 3 | 6 | 8 | 13 | 18 | 34 | 35 | 36 | 37 | 38 | 61 | 84 |
| Temperature, top, °F | | | | | | | | | | | | | |
| Temperature, bottom, °F | | | | | | | | | | | | | |
| Temperature, average, °F | 100 | 24 | −74 | −140 | −153 | −140 | −166 | −157.5 | −148 | −76 | 80 | 6 | −3 |
| Pressure, p.s.i.a. | 415 | 410 | 405 | 400 | 330 | 395 | 300 | 310 | 265 | 220 | 350 | | 320 |
| Million s.c.f./day | 7.925 | 7.925 | 7.925 | 7.925 | 3.601 | 4.324 | 1.631 | 5.232 | 5.232 | 5.232 | 5.232 | | |
| Gallons/minute | | | | | | | | | | | | 47.6 | 44.8 |

| Condition | Stream | | |
|---|---|---|---|
| | 100 | 123 | 105 |
| Temperature, °F | 209 | 100 | −32 |
| Pressure, p.s.i.a. | 340 | 200 | 19 |
| Million s.c.f./day | | | |
| Gallons/minute | 2.8 | | |
| Pounds/hour | | [1] 25,400 | [2] 25,400 |

[1] Liquid.
[2] Vapor.

| Component | Stream | |
|---|---|---|
| | Feed 1, mols/day | Product 92, mols/day |
| Hydrogen | 3,241 | |
| Nitrogen | 1,949 | |
| Methane | 8,198 | 159 |
| Ethylene | 3,197 | 2,890 |
| Ethane | 3,488 | 3,283 |
| Propylene | 428 | 384 |
| Propane | 102 | 15 |
| Butylenes | 92 | |
| Isobutane | 5 | |
| Normal Butane | 39 | |
| Pentenes | 26 | |
| Isopentane | 50 | |

Reasonable variations and modifications of this invention can be made, or followed, in view of the foregoing, without departing from the spirit or scope thereof.

We claim:

1. A method of purifying an ethylene-hydrocarbon feed containing hydrocarbons and other compounds that boil at a lower temperature than ethylene which comprises cooling said feed to a temperature and pressure at which substantially all the components in said feed are liquefied except said hydrocarbons and other compounds, removing at least a part of said hydrocarbons and other compounds to form a first vaporous stream, fractionating the remaining liquid feed portion to remove overhead substantially the remainder of said hydrocarbons and other compounds in said feed and to form a second vaporous stream, heat exchanging the second vaporous stream with a composite stream to liquify a portion of said second vaporous stream and leave a third vaporous stream formed from said second vaporous stream, lowering the pressures of said first and third vaporous streams to expand and to cool same, combining said cooled first and third vaporous streams to form the composite stream, contacting in the said heat exchange relationship said composite stream and said second vaporous stream to cool and therefore condense at least in part said second vaporous stream, thereafter contacting in heat exchange relationship at least one time said composite stream with incoming ethylene-hydrocarbon feed which is to be purified to cool and condense at least a part of said feed for subsequent separation therefrom of hydrocarbons and other compounds that boil at a lower temperature than ethylene.

2. A method of purifying a hydrocarbon feed containing at least 5 mol percent ethylene and also containing hydrocarbons and other compounds that boil at a lower temperature than ethylene which comprises cooling said feed to a temperature and pressure at which substantially all the components in said feed are liquefied except said hydrocarbons and other compounds, removing at least a part of the vaporous hydrocarbons and other compounds to form a first vaporous stream, fractionating the remaining liquid feed portion to remove overhead substantially the remainder of vaporous hydrocarbons and other compounds associated with said feed and to form a second vaporous stream, heat exchanging the second vaporous stream with a composite stream to liquefy a portion of said second vaporous stream and leave a third vaporous stream formed from said second vaporous stream, separately lowering the pressures of said first and third vaporous streams to expand and to cool same to a temperature substantially below that of the overhead hydrocarbons and other compounds formed by fractionating said feed, combining said cooled first and third vaporous streams to form the composite stream having a temperature below said overhead hydrocarbons and other compounds, contacting in the said heat exchange relationship said composite stream and said second vaporous stream to cool and therefore condense at least in part said second vaporous stream, thereafter contacting in heat exchange relationship and for at least one time said composite stream with incoming hydrocarbon feed which is to be purified to cool and condense at least in part said feed for subsequent separation therefrom of hydrocarbons and other compounds that boil at a lower temperature than ethylene.

3. A method according to claim 2 wherein said feed is cooled to a temperature of at least minus 130° F. and brought to a pressure of at least 350 p.s.i.a., said first vaporous stream is expanded to a temperature of at least minus 145° F., said second vaporous stream is expanded to a temperature of at least minus 160° F. and the composite stream has a temperature of at least minus 150° F.

4. A method of purifying a hydrocarbon feed containing at least 5 mol percent ethylene and also containing at least 20 mol percent hydrocarbons and other compounds that boil at a lower temperature than ethylene which comprises cooling said feed to a temperature of at least minus 130° F. and a pressure of at least 350 p.s.i.a. to liquefy substantially all of the feed except said hydrocarbons and other compounds that boil at a lower temperature than ethylene, removing at least a part of the vaporous hydrocarbons and other compounds to form a first vaporous stream, fractionating the remaining feed liquid portion to remove overhead substantially the remainder of said vaporous hydrocarbons and other compounds associated with said feed and to form a second vaporous stream, heat exchanging the second vaporous stream with a composite stream to liquefy a portion of said second vaporous stream and leave a third vaporous stream formed from said second vaporous stream, lowering the pressure of said first stream to expand and to cool same to a temperature of at least minus 145° F., lowering the pressure on said third vaporous stream to expand and to cool same to a temperature of at least minus 160° F., combining said cooled first and third vaporous streams to form the composite stream, contacting in the said heat exchange relationship at least one time hydrocarbon streams which are upstream from the point of formation of said composite stream in order to utilize the refrigeration potential of the composite stream to cool, condense and otherwise prepare said upstream streams for purification and for subsequent separation therefrom of hydrocarbons and other compounds that boil at a lower temperature than ethylene.

References Cited by the Examiner

UNITED STATES PATENTS

| | | | |
|---|---|---|---|
| 2,471,602 | 5/1949 | Arnold | 62—27 |
| 2,973,834 | 3/1961 | Cicalese. | |
| 3,186,182 | 6/1965 | Grossman et al. | 62—28 X |
| 3,242,682 | 3/1966 | English | 62—28 |

NORMAN YUDKOFF, *Primary Examiner.*

V. W. PRETKA, *Assistant Examiner.*